United States Patent Office 3,511,372
Patented May 12, 1970

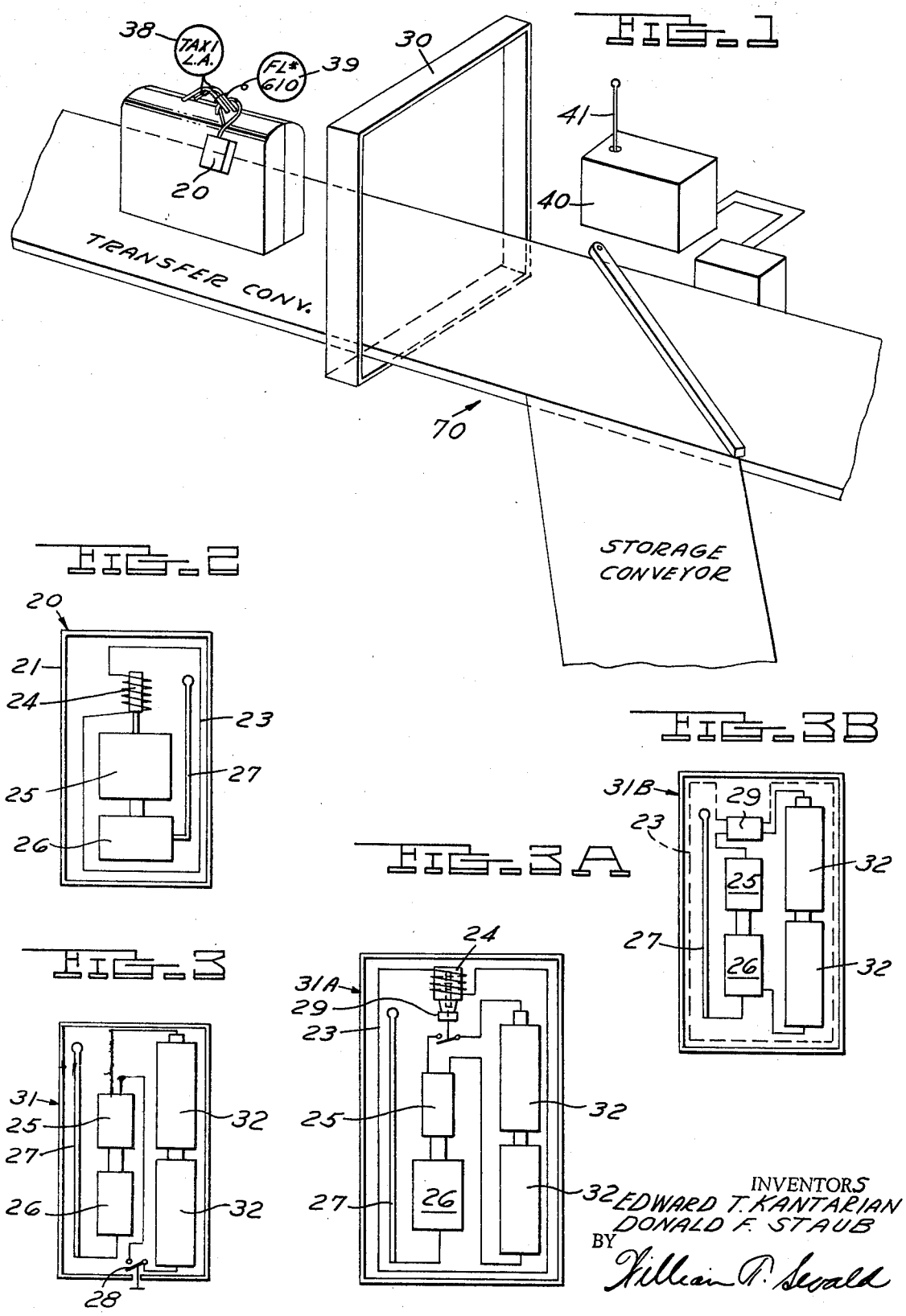

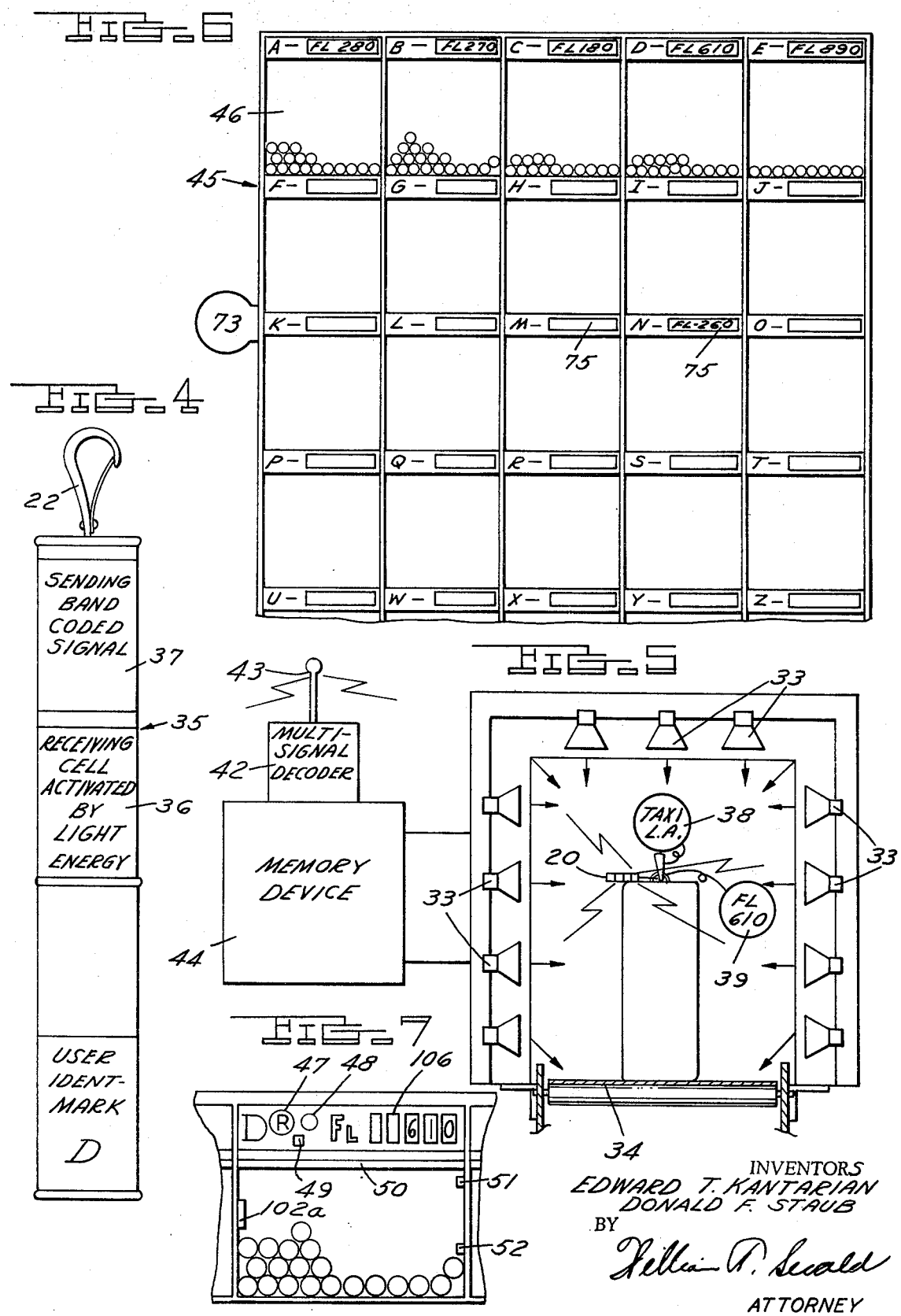

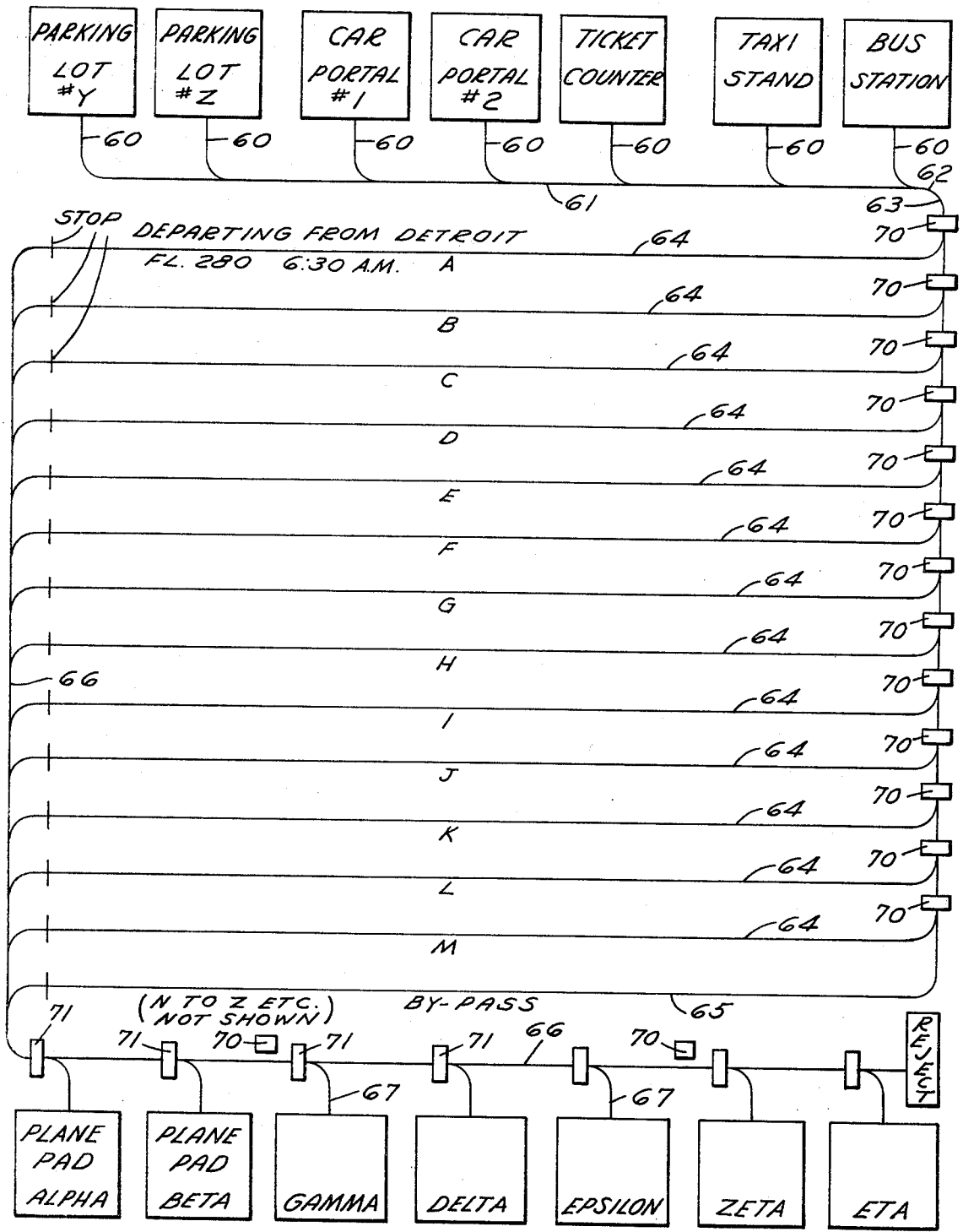

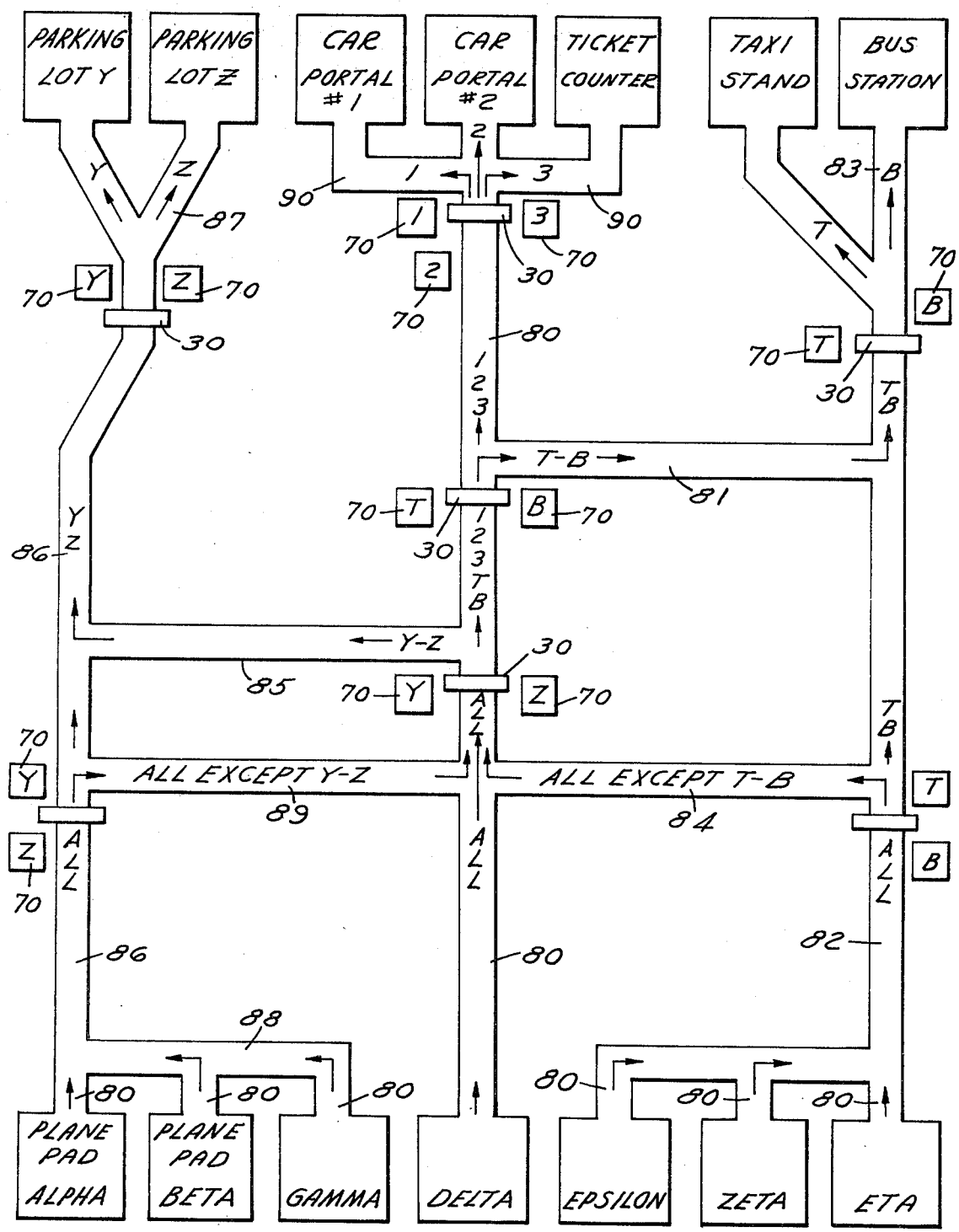

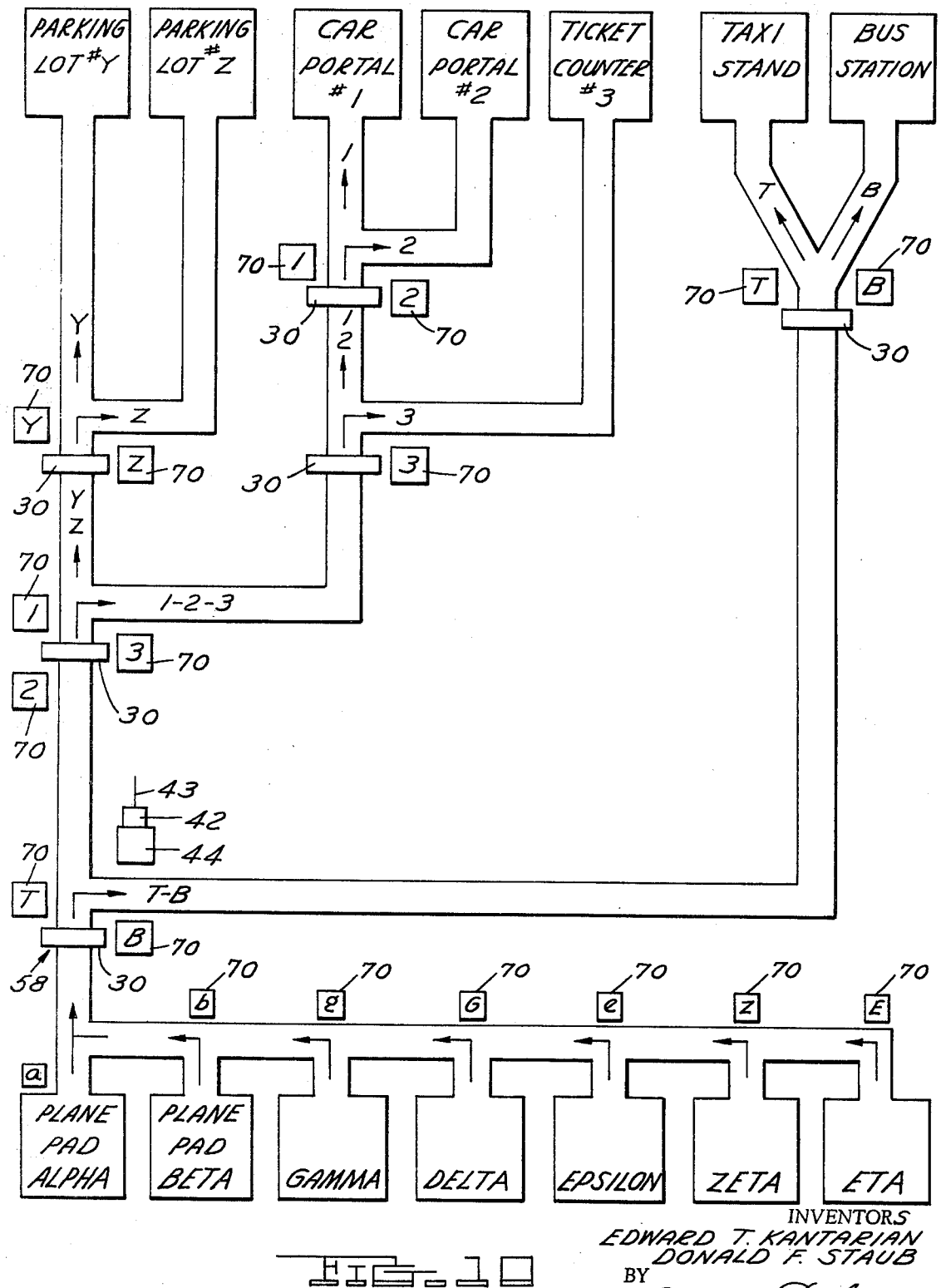

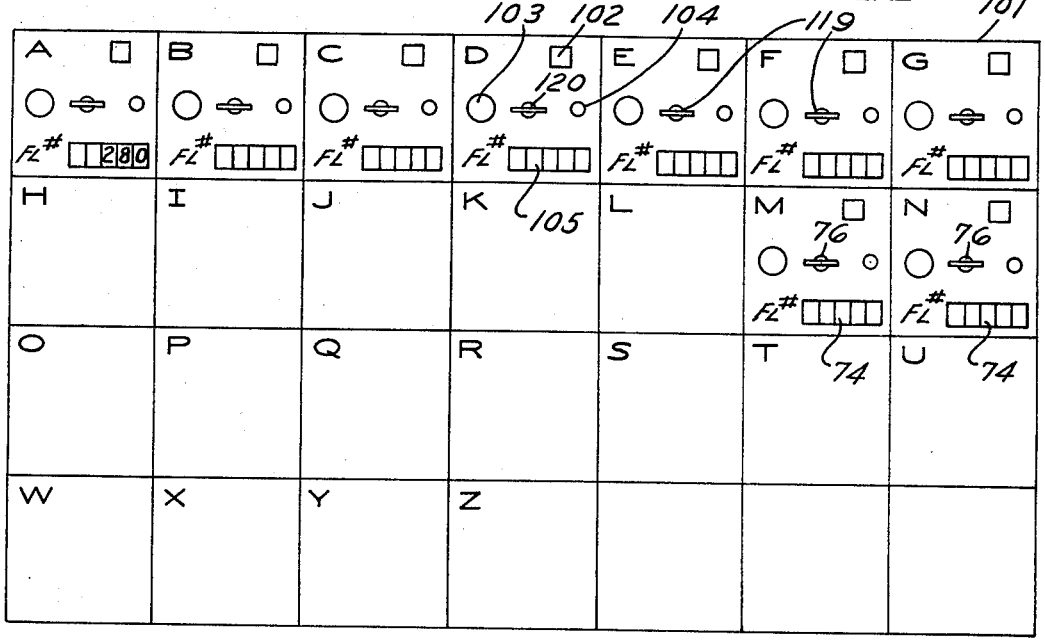
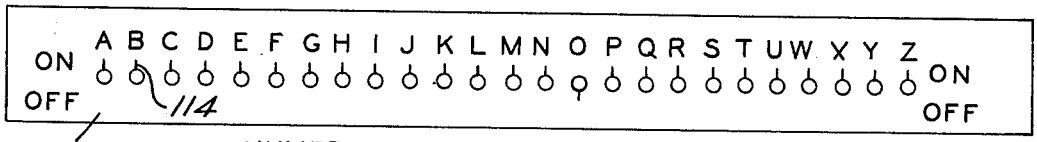
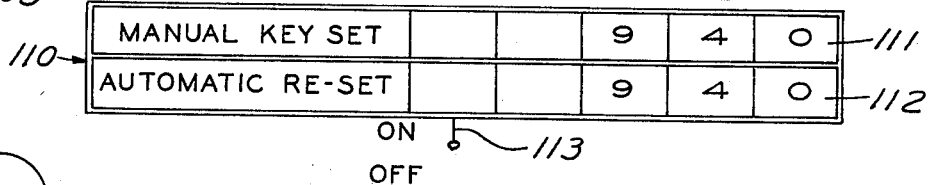
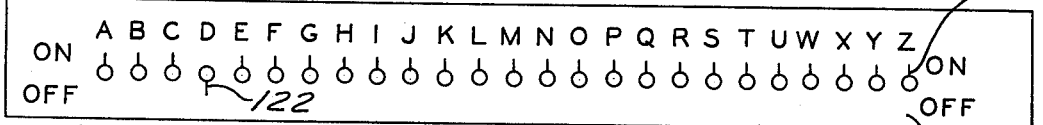
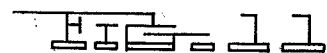
FIG. 11

3,511,372
ARTICLE HANDLING MEANS, SYSTEMS,
AND DEVICES
Edward T. Kantarian, 4325 Arlington Drive, Royal Oak,
Mich. 48067, and Donald F. Staub, 3570 Walbridge
Drive, Bloomfield Hills, Mich. 48013
Filed Feb. 26, 1968, Ser. No. 708,279
Int. Cl. B07c 5/34
U.S. Cl. 209—111.5                     16 Claims

ABSTRACT OF THE DISCLOSURE

Article handling system means, and devices such as for airlines which receive passenger baggage at random at a plurality of receiving locations at the origin air terminal for a plurality of flights for shipment by various planes to a plurality of destination air terminals and distribution to a plurality of pick-up positions at each destination air terminal, including determining for each article of baggage at receiving location of the origin air terminal the information of the departing flight and departing plane location, the destination air terminal and the pick-up position for each item of baggage at the destination air terminal identifying at the origin air terminal each article such as by tag or label as to destination air terminal and a pick-up position thereat; including at the origin air terminal attaching a coded signal device to each item of baggage for emitting signals, such as sound or R.F., with the signal identified with the departing flight; placing the baggage items so identified by signal device in a conveyor system at the origin air terminal; sorting the baggage at the original air terminal by signal for outgoing flights; optionally accumulating, holding and later releasing baggage items on storage conveyors in a group for outgoing flights or directly sending the baggage items to the departing flight location; loading the baggage on the outgoing flight; unloading the baggage at the destination air terminal including attaching at the destination air terminal from the information on the tag or label a coded signal device to each item of baggage with the signal identified with the pick-up position at the destination air terminal; placing the baggage items at the destination air terminal in a conveyor system so identified by signal sorting the baggage by signal and conveying it to the pick-up position; including central control means and system operation; receiving and distributing position means and operation, and signal means devices, signal activating means, and signal reading and actuating means, and also including memory means for controlling a system, central control panels, racks for holding signal devices in bins; and means on the panels, racks and bins providing advisory information to those working the system; the system and devices also being applicable for handling items other than baggage and suitable for other uses such as manufacturing, warehousing, etc.

This invention relates to handling systems, methods, means, and devices such as for baggage and other items.

The handling of airplane passenger baggage is described herein to explain the invention. This is not by way of limitation as the invention is suitable for handling other items in other industries.

Passengers coming to their origin air terminal turn in baggage which is to be returned to them at their destination air terminal. These passengers come by cab, bus, car, and air and arrive at the origin airport at various dispersed locations. They depart on various flights from different spaced locations. They come to ground at the various destination air terminals at different spaced locations. They go from the destination air terminal by cab, bus, car, and air at various dispersed locations.

At each air terminal origin passengers and their baggage cross paths with destination passengers and their baggage. Baggage is coming in and going out at cab stands, bus stations, car portals, helicopter-ports, ticket counters, and car parking lots of the land service facilities and at the plane pads of the air service facilities.

The individual passenger and his baggage comes in at one of the various reception points of the origin air terminal. He and his baggage leave from a particular location, on a particular flight, fly to a particular destination air terminal, arrive at a particular location, and go from one of the various separation points at the destination air terminal. These are known factors. The passenger is self-propelled and self-guided. The baggage is not. The problem is to handle the baggage substantially apace with the passenger. It is therefore necessary to propel and guide the baggage apace with the passenger.

Presently about 109,500,000 domestic passengers yearly fly in the United States of America. This is about 300,000 passengers daily. Airlines will handle two pieces of baggage per passenger without extra cost and it is estimated that this averages out to at least one piece of baggage per passenger handled by airlines. Planes presently carry up to two hundred passengers domestically. Overseas planes carry more passengers with more baggage per passenger. Overseas passengers and baggage is additive to the domestic traffic. At present flying time from New York to Los Angeles is five hours, New York to London six and one-half hours, Detroit to Chicago one hour, and Detroit to New York one and one-half hours.

The passenger wants to come to the origin airport, deposit his baggage, get on the plane, fly, get off the plane, pick up his baggage, and leave the destination air terminal without delay. In other words, he does not want to spend any appreciable time depositing or picking up baggage nor does he wish to carry the baggage any appreciable distance. The passenger does not want baggage handling time delays to detract from the speed of his travel by air.

While the baggage handling problem is presently very great, the problem is ever increasing with more and more people flying, larger and larger aircraft, and faster and faster air speeds. The baggage problem is not only important to the passenger but also important to the airlines as non-paying down-time for loading and unloading baggage detracts from paying flying-time of each aircraft.

With the foregoing in view it is a primary object of the invention to provide handling systems, means, methods, and devices for guiding and propelling baggage substantially apace with the passenger in the airline industry and in other industries handling other items, coordinated with the demands of the situation.

An object of the invention is to provide systems, means, methods, and devices for guiding and propelling baggage from the passenger's point of entrance at the origin air terminal to the passenger's point of departure from the origin air terminal and at the destination air terminal to guide and propel baggage from incoming planes to the passenger's point of exit from the destination terminal.

An object of the invention is to identify the baggage at the origin air terminal not only as to flight and departing airplane position at the origin air terminal but also as to destination air terminal and baggage redelivery point to the passenger at the destination air terminal.

An object of the invention is to provide baggage or article handling conveyor systems having means actuated by a coded signal emitting device carried by each baggage item wherein each article or associated group of articles is identified at the receiving location by attaching a signal emitting device thereto, conveying the article so identifiable from a receiving location or a plurality of receiving locations to a signal reading point or points in storage, collection, or distribution position, reading the signals at the storage, collection, or distribution position to activate conveyor switch means to sort and/or accumulate articles similarly identified in separate storage locations, and conveying each article directly or the accumulated similarly identified articles to a loading point or pick-up position selectively.

An object of the invention is to provide signal receiving and decoding means in combination with a memory device or system which may be mechanical or electrical with the signal reading and decoding means programming the memory device or system so that the memory device or system controls the conveyor system as programmed to handle, store, and/or deliver each/baggage item selectively.

An object of the invention is to provide a signal reading device and memory device combination so that in the use of radiated energy to activate the signal emitting devices, the radiated energy and the emitted signal may be shrouded preventing the interference with the baggage system by other radiated energies and other signals and preventing the interference of the energy and signals of the baggage handling system with other systems and devices at the installation such as air terminal communications, radios, telephones, automatic devices, etc.

An object of the invention is to provide a signal reading device and memory device combination so that only one signal energizing and reading and decoding device is needed thereby eliminating the disposition of multiple signal energizing and decoding devices throughout the system and the elimination of other signals interfering with them and eliminating their interfering with other systems.

An object of the invention is to provide great facility in handling airplane baggage both for departing and arriving flights so that passengers may dispose of their baggage at their various points of entrance at an origin terminal and may have their baggage returned to them at their various points of exit from a destination terminal substantially without delay and without the passenger or a porter having to carry the baggage long distances.

An object of the invention is to provide a signal emitting device attachable to each article or item of baggage which emits a signal identifiable by the signal reading means in the system such as a sound signal, a radio frequency signal, and/or a visible or invisible light signal with the coded signal emitting device being either self-energized or remotely energized.

An object of the invention is to provide means for activating and/or reading the signals at various positions in the system and means actuated by the signal reading means which switch the conveyors to guide and convey the articles so identified to the desired destination.

An object of the invention is to provide signal emitting identifying devices in code groups having different coded signals with the group signal identifying items in the group.

An object of the invention is to provide an article or baggage handling system which is operable and controllable from a control center by one man or a few men so that remote receiving points, storage points, and shipping points are all coordinated centrally by a person responsible for proper reception, identification, accumulation in storage, dispatch from storage, timing, and shipping point determination.

An object of the invention is to provide racks at the various receiving points for selectively holding the baggage identifying signal emitting devices in designated groups so that the porter supervising the reception of baggage has efficient means for handling and selecting an identifying device from the proper group.

An object of the invention is to provide designation means on the racks advising what signal devices to use on baggage for certain destinations so that the attendant is informed as to the proper signal emitting device to use.

An object of the invention is to provide identity means such as signal lights, doors, buzzers, and other reference means on the racks aiding and insuring proper use of the signal emitting devices by the attendant.

An object of the invention is to provide control means on the central control panel and circuits for operating the identity means on the racks.

An object of the invention is to provide a control means and circuits from the identity means on the racks leading back to the central control panel advising the person controlling the system that the identity means at the racks are working properly and that the attendants a the racks are advised as to current conditions of the system.

An object of the invention is to provide separate locations in the storage position for groups of articles identified with the same group signal so that articles or baggage received at the plurality of receiving points over a period of time identified by various group signals may be accumulated in groups in certain storage locations.

An object of the invention is to provide a substantially automatic conveyor system at air terminals which leads to and from cab stands, bus stations, car ports, heli-ports, and parking lots on the one hand and the various spaced positions of the airplanes on the other hand to carry baggage bi-directionally between these points.

These and other objects of the invention will become apparent by reference to the following description of an automatic article or baggage item handling system taken in connection with the accompanying drawings in which:

FIG. 1 is a schematic perspective view of a portion of a conveyor system with parts broken away showing an item of baggage identified by a coded signal emitting device, a coil for energizing the signal emitting device, a coded signal receiving device, and servo means actuated by the signal receiving device for switching the baggage item on coded signal to guide the baggage in the conveyor system.

FIG. 2 is a schematic plan view of a remotely energized signal emitting device with the cover removed showing internal parts and construction.

FIG. 3 is a schematic plan view of a battery powered signal emitting device with the cover removed showing internal parts and construction.

FIG. 3A is a schematic showing of a device similar to FIG. 3 wherein battery power is switched in by a transistor when the induction power coil is energized.

FIG. 3B is a schematic showing similar to FIGS. 3 and 3A showing a transistor switch directly energized by the pick-up loop to conduct current in the signal circuit.

FIG. 4 is a side elevational view of a cylindrically shaped signal emitting device remotely energized by light energy.

FIG. 5 is a cross sectional view of a conveyor portion showing signal emitting device energizing lamps in elevation diagrammatically energizing a signal emitting device on a baggage item by light energy to send out a signal and a memory device receiving the emitted coded signals and controlling the conveying system.

FIG. 6 is a face elevational view of a portion of a storage rack for holding signal emitting devices in identified groups.

FIG. 7 is an enlarged face elevational view of one of the bins of the rack seen in FIG. 5.

FIG. 8 is a schematic view of a conveyor system for handling baggage from originating passengers leading between baggage receiving points and baggage loading and shipping points.

FIG. 9 is a schematic view of a conveyor system for handling baggage from aircraft flying in with destination passengers leading between aircraft baggage unloading points and passenger baggage pick-up points.

FIG. 10 is a schematic view of a conveyor system similar to that seen in FIG. 9 showing a different organization.

FIG. 11 is a face elevational view of a master control panel for centrally controlling the operation of the system.

Referring now to the drawings wherein like numerals refer to like and corresponding parts throughout the several views, the systems, means, methods, and devices of the invention for handling items and baggage comprise a plurality of baggage reception points, a plurality of baggage shipping or pick-up points, conveyors leading between the reception and pick-up points, coded signal means on the baggage, coded signal reading means along the conveyors, servo means for switching baggage in the conveyor system controlled by the signal reading means so that the conveyor system propels the baggage and the signal emitting and reading means guide the baggage through the conveyor system from the point of introduction to the desired point of emergence with the invention also providing means for grouping the signal emitting devices in visually identified groups, and central control means for maintaining operating organization. The invention also includes a signal reading and decoding device reading and decoding all signals in combination with a memory device which is programmed by the signal decoding device with the programmed memory device controlling and guiding the baggage in the conveyor system as programmed. The invention also includes using the signal reading device and memory device combination singly or in combination with various signal reading devices in a system.

CODED SIGNAL EMITTING AND READING DEVICES

A coded signal emitting device 20, FIGS. 1 and 2, comprises a case 21, a hook 22 for attaching the device 20 to baggage, an energy pick-up loop 23, a power coil 24 connected to the loop 23, a signal encoder 25 attached to the coil 24, a transmitter 26 connected to the encoder 25, and a sending antenna 27 connected to the transmitter 26.

An energizer coil 30, FIG. 1, transmits energy in its location which is received by the energy pick-up loop 23 of the signal emitting device 20. This powers the device 20 to emit a coded signal. The emitted signal may be sound, light, or R.F.

A self-contained coded signal device 31, FIG. 3, may have batteries 32 furnishing power to the power coil 24, encoder 25, transmitter 26, and antenna 27. A manual switch 28 on the device 31 controls the battery circuit. The self-contained device 31 when the switch 28 is closed emits signals when attached to baggage which necessitates frequent checking and battery replacements.

A signal emitting device 31A, FIG. 3A, has an energy pick-up loop 23 connected to a power coil 24. A transistor 29 is connected to the power coil 24. The transistor 29 is positioned in the signal circuit including the batteries 32, encoder 25, and transmitter 26. The antenna 27 is connected to the transmitter 26. The transistor 29 acts as a switch in the signal circuit normally interrupting the circuit to preserve the power of the batteries 32. The transistor 29 is activated to connect battery 32 power in the signal circuit when energized. The transistor 29 is energized by the power coil 24. The power coil 24 is energized by the energy field or loop 23 when energy is transmitted to it by sound, light or R.F. such as the induction coil 30 or lamps 33. Since this device only uses battery power when the switch is closed, the use of battery power is minimal insuring long service of the device on a set of batteries.

In signal emitting device 31B, FIG. 3B, the transistor 29 is energized directly by the energy pick-up loop 23. When so energized the transistor 29 conducts current in the signal circuit including the batteries 32, encoder 25, and transmitter 26. This device emits a coded signal upon energy being radiated to affect it and so uses battery power only during that time.

A signal receiver and decoder 40 has an antenna 41 which picks up the emitted signals of the signal emitting devices 20 and 31. The receiver and decoder 40 reads the emitted coded signals. The receiver and decoder 40 may operate on a certain coded signal to activate control means and may remain inactive on other coded signals. The receiver and decoder 40 may actuate servo-mechanisms which control actuation of power devices which switch or guide the baggage item in the conveyor system at the local position. Also a signal receiver and decoder 40 may read and decode all coded signals emitted by the devices 20 and 31 and feed them to memory device which then controls guiding the items in the conveyor system.

A plurality of signal emitting devices 20 each having the same coded signal comprises a code group. There may be several hundred devices in each group. There may be twenty five to one hundred groups with each group having a discernably different signal. The devices 20 in each group are identified as to the group by visual markings such as by alphabetical letters, numerals, or letter-numeral combinations.

An energizer coil 30, a signal receiver and decoder 40, servo-mechanisms, and power conveyor switch means 19 may be considered a unit for description purposes and this combination is referred to as unit 70, FIG. 1.

A rack 45, FIG. 6, has bins 46. Each bin 46 holds a group of signal emitting devices 20. The size of the rack 45 and the number and size of the bins 46 is coordinated to the size of the devices, the number of devices in each group, and the number of groups. The bins 46 are equipped with the visual markings identifying the group to be held in each bin 46. The bin may carry the flight numerical designation assigned to the group of devices contained in the bin and these are preferably remotely controlled such as by digital mechanism similar to that used in a stock broker's board.

Additionally each bin may have visual signal lamps such as a red lamp 47 signifying a hold on the use of the group of the bin, a green lamp 48, signifying the present use of the group of the bin, and an amber check lamp 49. Also each bin may be equipped with a door 50, a limit switch 51 actuated by the door 50 in its open position, and a limit switch 52 actuated by the door 50 in its closed position. The limit switches 51 and 52 are connected in the amber check lamp 49 circuit and with the central control panel seen in FIG. 7 as hereinafter more fully explained.

While the signal emitting devices 20 and 31 and the receiver and decoder 40 have been described in terms of R.F. signals and the transmitted energy in terms of R.F., it will be understood that coded sound waves may be used for signals with sending and receiving diaphragms and/or reeds substituted for the sending antenna 27 and receiving antenna 41 respectively. Also the transmitted energy may be sound with suitable reeds or diaphragms substituted for the energiing coil 30 and the receiving loop 23.

Relative to using light to transmit activating power, FIGS. 4 and 5, a group of lamps 33 are located over a conveyor section 34. A light energized device 35 has a light ray receiving photo-electric cell 36 and signal sending band 37. Intermediate the cell 36 and band 37, the power coil 24, encoder 25, and transmitter 26 are connected in a circuit in a R.F. signal system. In a sound signal system the reeds or diaphragms are used instead of the signal sending band 37.

While R.F. transmitted energy and R.F. coded signals are used herein to describe the invention, it will be understood that sound and light may be substituted for R.F. or used in combination with R.F.

THE CONVEYOR SYSTEM

The conveyor system is designed to suit the particular air terminal and the systems disclosed are examplary only relative to describing the systems, means, and devices of the invention. An air terminal has its land service facilities in locations distinct and spaced from its air service facilities in other locations. These are diagrammatically shown in FIGS. 8–10. For ease of understanding and simplicity of description, FIG. 8 is used to illustrate handling of baggage originating at the air terminal and leaving on outgoing planes. FIGS. 9 and 10 are used to illustrate the handling of baggage coming in on arriving aircraft and leaving with destination passengers at the land service facilities.

The air terminal land service facilities may comprise parking lots Y and Z; car portals Nos. 1 and 2, a ticket counter, a taxi stand; and a bus station. These are shown at the top of FIGS. 8–10. The air terminal air facilities may comprise aircraft loading and unloading pads alpha through eta. These are shown at the bottom of FIGS. 8–10.

Referring now to FIG. 8, a conveyor system is shown diagrammatically between the land service facilities and the air service facilities. A receiving conveyor 60 leads from each land service facility. An transfer conveyor 61 connects with each receiving conveyor 60 and leads to a collection point 62 at which all incoming baggage from originating passengers is passed. The transfer conveyor 61 transfer to a distribution conveyor 63. Storage shunt conveyors 64A–M lead from the distribution conveyor 63. A by-pass conveyor 65 may lead from the distribution conveyor 63 at some point such as shown at the bottom of FIG. 8. A ship out conveyor 66 lies at the other end of the storage and by-pass conveyors 64–65 and leads past the plane pads alpha-eta. Pad conveyor 67 lead from the ship-out conveyor 66 to the plane pads and have adjustable extensions leading into the cargo holds of the airplanes.

In one system organization, a unit 70 reading coded signal A is located on the distribution conveyor 63 upstream of storage conveyor 64A. A unit 70 reading coded signal B is located on the distribution conveyor 63 upstream of storage conveyor 64B. Units 70 reading coded signals C–M are located on the distribution conveyor 63 upstream of storage conveyor 64–C–M respectively. By-pass conveyor 65 may or may not be so equipped. Conveyor switch means 71 are located on ship out conveyor 66 upstream of each pad conveyor 67 leading to plane pads alpha-eta. Units 70 may also be located at the switch means 71 and may operate the switch means 71. The flow of the exemplary conveyor system of FIG. 8 is from the land service facilities to the air service facilities.

LAND TO AIR BAGGAGE SYSTEM

In the use and operation of the system of FIG. 8, the passengers arrive at the parking lots, car portals, ticket counter, taxi stand, and bus station with their baggage together with the intelligence or information relative to their trip. This includes the airline, their destination, flight number, and how and/or where they will be leaving their destination air terminal. The information as to where or how they will leave their destination air terminal is written on a tag or label 38 and attached to the baggage by the attendant. This is for later use at the destination air terminal. The information as to their flight is written on a tag 39 or label and attached to the baggage by the attendant. The attendant then attaches the proper coded signal device 20 for the departing flight to the baggage of each passenger, such as group D, and puts the baggage on the conveyors 60 which lead into the transfer conveyor 61 leading to the distribution conveyor 63 past the collection point 62. The proper coded signal device 20 is a device of that group having the prescribed signal which will guide the baggage through the conveyor system to the plane pad at which the passenger owning the baggage will depart. This is later explained more fully. The distribution conveyor 63 conveys the baggage past the units 70 which read the coded signals of the signal devices 20 attached to the baggage. Upon reading the coded signal to which the unit 70 reacts; the baggage may be switched to a storage conveyor 64 such as storage conveyor 64D.

This baggage so identified is held on the storage conveyor 64D until plane loading time. The baggage also may be sent directly to a plane pad for loading. This is as selectively controlled.

Passengers usually arrive at the land service facilities with their baggage some period of time prior to the time of departure. This period may be between over an hour and ten minutes or so. The storage conveyors 64 provide means for keeping the baggage for each departing flight in a separate group until plane loading time. Passengers for ten or more departing flights may be arriving at the same time. By identifying each baggage item with a coded signal emitting device 20 and each storage conveyor with a coded signal group reading device and conveyor switch unit 70 assigned to a certain flight, the baggage for the various flights is sorted in the system and stored in a group on a known storage conveyor 64. When the time comes to load baggage on a certain flight, the baggage for that flight is released in a group from the storage conveyor 64 onto the ship out conveyor 66 and the switch means 71 at the proper plane pad thrown or activated to direct the baggage to the proper pad conveyor 67 which carries the baggage to the hold of the plane. The organization and control of the system is more fully explained later.

It will be understood however, that the coded signal devices may be used to guide the baggage directly to the plane pads. In this instance units 70 may be located adjacent the switch means 71 and the baggage travels from the distribution conveyor 63 across the by-pass conveyor 65 to the ship out conveyor 66 from which it is switched to the proper pad conveyor 67 by coded signal. This use may be solely organized or in combination with use of the storage conveyors such as for late arriving passengers whose baggage is loaded immediately without storage time.

The foregoing described system employs the units 70 and emitted signals throughout the conveyor system. Reference is now made to a system where the emitted coded signal is read at one location and a memory device controls the conveyor system thereafter.

A multi-signal receiving and decoding device 42 receives and decodes all group signals. Each decoded signal is fed to a memory device 44. The memory device may be mechanical, electrical, and/or electronic or may be a computer or a computer memory bank. The memory device 44 is programmed by the coded signal fed to it by the multi-signal receiving and decoding device 42. The memory device 44 is operatively connected by circuits to servo-mechanisms and/or power operated means to operate the conveyor system relative to storage conveyors 64, by-pass conveyor 65, ship out conveyor 66, and/or pad conveyors 67 singly and/or in combination. It will be understood that the units 70 may be employed in combination with one or more memory devices in a conveyor system, FIG. 5.

AIR TO LAND BAGGAGE SYSTEM

Referring now to FIGS. 9 and 10 showing a conveyor system for handling baggage coming in on arriving planes at the air facilities for return to passengers at the land facilities, it will be understood that baggage flow is from bottom to top as shown.

Planes arriving at the plane pads alpha-eta have baggage which will be returned to the passengers at the various positions of the land service facilities to which the passengers will come to get their baggage. It is thus the purpose of the system to get the baggage to the proper position prior to or just after the passenger gets there.

A rack 45 having bins 46 with groups of coded signal devices 20 therein are positioned at each plane pad alpha-eta. As the baggage comes down the pad conveyor 80 from the plane cargo hold, the porter inspects the tag or label 38 on the baggage which has the information as to the location of the land service facilities from which the passenger owning the baggage will depart. Each position of the land service facilities is assigned a group of coded signal devices 20 identified relative to parking lots Y and Z, car portals 1, and 2, the taxi stand, and the bus station. Thus if the baggage is to be returned to the passenger at the bus station, a device 20 of the bus station code group is attached to the baggage and the baggage so identified put into the system. The return of baggage to the passengers usually entails no storage problem but a storage place may be set up and designated with a coded group if desired.

Thus upon the arrival of a plane the baggage is quickly unloaded, identified with a proper signal device 20 and put into the conveyor system where it is propelled and guided to the desired pick-up position. To facilitate this, units 70 are disposed throughout the system to read the coded signal of the devices 20 on the baggage and to switch or not switch the baggage on proper signal or lack of proper signal respectively. The system is organized to suit the geography of the air terminal and the systems of FIGS. 9 and 10 are exemplary of adaptability to efficient engineering plan. FIG. 9 shows a system where the baggage is not accumulated at a collection point and is sorted for various points at several places whereas FIG. 10 shows a system where the baggage is first accumulated at a collection point and then progressively sorted. This may be as designed. The system of FIG. 8 is also subject to these modifications.

In the system of FIG. 9, a baggage item arriving at pad delta for pick-up at the bus station travels conveyor 80 to unit 70–B where it is switched to conveyor 81 and shunted on to conveyor 82. As it passes unit 70–B on conveyor 82 it is switched on to bus station conveyor 83 and is propelled to the bus station. A baggage item arriving at pad eta to be picked up at parking lot 2 travels conveyor 82 to where it is shunted onto conveyor 84 which shunts it onto conveyor 80 which carries it to unit 70–Z which switches it onto conveyor 85 which shunts it onto conveyor 86 which carries it to unit 70–Z thereon which switches it to conveyor 87 to parking lot Z. A baggage item arriving at pad beta to be picked up at car portal No. 1 is shunted onto conveyor 88 which shunts it onto conveyor 86 which shunts it onto conveyor 89 which shunts it onto conveyor 80 which carries it to unit 70–3 which switches it onto conveyor 90 to car portal No. 1. From these examples the system will be readily understood.

At a peak load period planes at all pads alpha-eta may be putting baggage items in the system identified with coded signal devices 20 for return to passengers at all the pick-up positions of the land service facilities. Thus as shown seven planes may put 500 to 1500 or more baggage items into the system and each one will be guided and propelled to the desired pick-up point substantially apace the passengers so that the baggage is returned without delay and at a convenient point obviating the passenger having to carry it to the parking lot or other land service facility.

While FIG. 8 has been described as a land to air service system and FIGS. 9 and 10 described as air to land service systems, it is apparent that each may be employed in the other direction and may be modified as desired.

Also the same system may be employed bi-directionally with the system conveyors flowing from air to ground at some times and flowing from ground to air at other times. In this regard, FIG. 10, the units 70 at the air service facilities are inactive when the flow is to land service facilities and the units 70 adjacent the land service facilities guide the baggage in the system. When the flow is land to air, the units 70 adjacent the land service facilities are inactive and the units 70 at the air service facilities guide the baggage to the plane pads.

Relative to a memory device 44 program control of a conveyor system, a multi-signal decoder 42 may be positioned adjacent a collection point 58, FIG. 10, to read and decode the signals of the signal emitting devices 20, 31, or 37 attached to the baggage items. The multi-decoder 42 feeds the memory device 44. The memory device 44 so programmed controls the switches or shunt means in the conveyors to guide each piece of baggage to its proper land service facility.

CENTRAL CONTROL MEANS AND OPERATION

Referring now to the centrally controlled operation of the baggage conveyor system, a master control panel 100 is operated by the person responsible for the operation of the system. The master control panel 100 is wired to each rack 45 at each baggage receiving location. The master control panel 100 has blocks 101 corresponding to the bins 46 of the rack 45 and similarly identified by alphabetical letters, FIG. 11.

The central control may comprise a public address microphone-speaker combination 72 on the control panel 100 and a microphone-speaker combination 73 on each rack 45. The person in control may advise the attendants at the racks audibly what group of signal devices to use and when to terminate their use.

The blocks 101 may be equipped with lightable panels 74 and the bins 46 may be equipped with lightable panels 75 such as shown at blocks M and N and bins M and N respectively. The panels 74 and 75 of block 101–M and bin 46–M are not lighted as shown. The panels 74 and 75 of block 101–N and bin 46–N are lighted as shown revealing the flight number behind the panels 74, 75. A switch 76 on the block 101 controls lighting the panels 74, 75. In this way the person in control may advise the attendants at the racks visually as to the use of the groups of the signal emitting devices.

Referring now to another system of central control, FIGS. 6, 7, 8 and 11, it will be noted that block 101–D of FIG. 11 has a square amber lamp 102, a large red lamp 103 and a small green lamp 104. The amber lamp 102 on the control panel 100 corresponds to the amber lamp 49 on the bin, the large red lamp 103 corresponds to the large red lamp 47 on the bin, and the small green lamp 104 corresponds to the small green lamp 48 on the bin. Each block 101 on the master control panel 100 has a numerical designation member 105 such as for plane flights and this corresponds to the numerical designation member 106 on each bin of the rack 45. Each bin door 50 is swingable between up and down positions and in FIG. 7 it is shown in the up position. The door 50 in the up position contacts the limit switch 51 to make a circuit and the door 50 in the down position contacts the limit switch 52 to make a circuit. The limit switches 51 and 52 are wired in parallel circuits between the amber light 102 on the control panel block 101 and a buzzer 102a on the bin and the circuitry is such that the buzzer 102a will buzz when the door 50 is not in the correct up or down position relative to the condition of the system as indicated by either the red lamps 103 and 47 being on or the green lamps 104 and 48 being on.

For setting the numerical designations on the blocks 105 and 106 of the control panel 100 and the bins 46 respectively, a switch bank 109 on the control panel 100 has individual switches 114 for connecting the numerical portions 105 and 106 of the blocks 101 and the bins 46 respectively in a circuit controlled by a digital changer mechanism as exemplified by a panel 110. The panel 110 has a manual keyset line 111 and an automatic reset line 112 and an on-off switch 113. Upon the operator desiring to set the numerical designation of a flight on a bin 46 of the racks 45 and the block 101 of the master control panel 100, he throws a switch 114 individually connecting in the desired bin 46 on all racks 45 and block 105 such as for example those designated by the letter O. By placing the switch 114 in the on position the numerical designation means 106 of O bins 46 and numerical designation members 105 on block 101 are connected to the digital reset panel 110. The operator then places the desired flight number on the manual keyset line 111. This may be flight No. 940, as shown in FIG. 11. Upon his setting the manual keyset panel 111 and closing the switch 114 to the members 105 of the O block and members 106 of the O bins and throwing the switch 113 from the off position to the on position, the digital indication members 105 and 106 at the O block 101 and at the O bins 46 of all the racks 45 will be changed to the numerical designation 940 as indicated. The operator or controller may change these numerical designations downstream timewise from the bins in use preparatory to his later activating the O bins for the use of the group of identification devices 20 to identify baggage being received for a certain flight number. This digital designation and reset system is similar in mechanism to stock price boards in brokerage offices.

Upon the controller determining that baggage should be received for a certain flight for later departure, he throws the switch 119 on the block 101 such as block O from the position energizing the red lamps 103 and 47 to the position energizing green lamps 102 and 48 and this position of the switch 119 makes a circuit through limit switch 52 on each bin to buzzer 102a whereupon the buzzer 102a is also energized producing an audible signal to each attendant at each rack 45. Upon the attendant at each rack 45 opening the door 50 on the O bin, the circuit to the buzzer 102a is broken and a portion of a circuit back to amber lamp 102 on control panel is closed and upon the opening of all O doors 50 on all racks 45 the complete circuit back to amber lamp 102 on the control panel 110 is completed and the amber light 102 comes on advising the controller that all doors have been opened on the O bins of all racks 45.

In the use of the system employing the speakers 72, 73 and the lightable panels 74, 75, the person in control lights the desired panels 74, 75 and makes a suitable announcement over the speakers 72, 73 to advise the attendants relative to the use of the signal devices in the system.

After some time has elapsed relative to a baggage receiving operation for a certain flight, such as the flight designated D, the controller determines that no more baggage may be accepted for departure on such certain flight. He then refers to the numerical designation of that flight on the block 101 designated D of master control panel 100 and throws the switch 119 to the off position relative to the green lamps 104 and 48 to the on position relative to the red lamps 103 and 47 which changes the light designations on all the D bins 46 identified for that flight from a "go" green light being on to the "stop" red light 47 being on. This makes a circuit through limit switch 51 to the buzzer 102a notifying all porters at all racks 45 that this particular group of devices designated D is now in the red light no-go position and that the door 50 must be closed to prevent further use of D identifying devices 20 contained therein. Upon all the porters closing the doors 50 on the bins designated D on all the racks 45 the limit switches 52 complete a circuit to the amber light 102 on the D identified block 101 of the control panel 100 and the controller is advised that all doors 50 on all bins alphabetical designated D for that numerically identified flight have been closed so that no further baggage should be identified by the use of the identifying devices 20 contained in the D bins of all the racks 45.

In a simpler system the controller may make the announcement on the speakers 72, 73 and/or throw the switch 76 to turn out the lamps behind the light panels 74, 75.

The master control panel 100 is equipped with a baggage loading point bank 121 having identified switches 120 corresponding to the various plane pads alpha-eta, FIG. 8. Each switch 120 activates the switch device 71 in the ship-out conveyor 66 to shunt a released group of baggage to the desired plane pad conveyor 67. The master control panel also has a storage conveyor 64 release switch bank 123 which has an individual switch 122 for each storage conveyor 64 so that the controller may release the baggage stored in a group on each storage conveyor 64 at the desired time.

Some time after terminating use of D identifying devices which stops further receiving of baggage for that flight in the system, the controller estimates that all baggage for the flight identified by devices 20 of group D have cleared distributing conveyor 63 and are on their proper shunt storage conveyor 64. He then determines at which baggage loading point alpha-eta the plane for this particular flight is located such as pad Delta on FIG. 8. He then throws switch 120 at Delta block of bank 121 which activates the switching device 71 in the ship-out conveyor 66 to shunt baggage articles to pad conveyor 67 at pad Delta and throws the control switch 122 on bank 123 activating the proper storage conveyor 64 to shunt the baggage onto ship out conveyor 66 whereupon the baggage is conveyed immediately in a group to plane pad Delta.

RESUME

While relatively complicated handling systems have been shown and described to illustrate and describe the invention, it will be understood that they are exemplary and that much more complex systems and very simple systems may be engineered to use the invention and that the engineered systems may or may not employ central controls as desired. Also modified central controls may be used and be simpler or more sophisticated as desired.

It will also be understood that various modifications may be made to the system such as increasing the number of storage conveyors or decreasing their number and it will be noted that storage conveyors as described in the system corresponding to designations O through Z have not been shown for lack of space in FIG. 8. It will further be understood that no storage conveyors may be employed to suit the demands of a particular handling system.

While the systems described have been described in terms and correlated relative to airplanes carrying up to 200 passengers, it will be understood that airplanes carrying 500 passengers will soon be in service and that many more people will be flying with the baggage problem increasing accordingly. Thus in a major airport terminal such as Kansas City, Chicago, New York, Miami, San Francisco, Los Angeles, and St. Louis, where many full flights originate on a non-stop basis to destination, that 500 passengers arriving for a flight each having an average of two pieces of baggage amount to 100 pieces of baggage per flight. Considering that the probability that there will be ten flights departing in a period of time such as an hour, the system will have to serve and service the baggage of five thousand people or ten thousand pieces of baggage in that time. Eastern Airlines presently operates 600 flights daily and is only half the size of United or American. To do such a job with minimum error in such a short period of time with maximum efficiency it will be understood that the central control embodiment of the invention more closely approaches ideal solution to the problem and eliminates the error and time lag relative to the controller reaching the porters personally by phone or public address system announcements.

It is also understood that at certain times and at certain days flights designated for certain cities originating at a point of origin or passing through intermediate points are flown together on the same airplane. At local terminals where flights are combined it is a simple matter to designate the flights separately as previously described and to release them closely together and to send them to the same loading point. Alternately an additional digital flight number designation may be set on the control panel and placed on the bins of the rack for providing a dual designation for the use of one group of identifying devices so that the baggage is combined upon arrival at the receiving point.

We claim:

1. In a handling system for propelling and guiding articles, propelling means and guiding means;
said propelling means including conveyor means for propelling articles between spaced locations;
a plurality of discharge stations located along said conveyor means;
said guiding means including servo-mechanism transfer means at each said discharge station in said conveyor means for switching articles on said conveyor means;
coded signal reading and decoding means located at each said discharge station controlling said servo-mechanism transfer means; and
a plurality of coded signal emitting means individually attachable to articles on said conveyor means identifying the articles to which attached by the emitted coded signal;
said coded signal emitting means being integrated in a plurality of groups with each said group having a distinct common code signal; said coded signal emitting means being normally inactive but energizable to actively emit a coded signal; and
energizing means at each said discharge station to power said coded signal emitting means to emit its coded signal;
said guiding means acting in combination with said propelling means with said coded signal emitting means on an article emitting a coded signal identifying the article to said coded signal reading and decoding means by the emitted coded signal with said coded signal reading and decoding means controlling said servo mechanism transfer means to guide the identified article as the article is moved by said propelling means.

2. In a system as set forth in claim 1, a memory device integrated between said coded signal reading and decoding means and said servo-mechanism transfer means;
said coded signal reading and decoding means being capable of receiving and decoding the various signals of said signal emitting devices and selectively feeding them to said memory device to program said memory device;
said programmed memory device actuating said servo-mechanism transfer means to guide the articles on said conveyor means.

3. In a system as set forth in claim 1, said coded signal emitting device comprising,
means in said device supplying power to said device;
a signal encoder connected to said means supplying power generating a coded signal;
a transmitter connected to said encoder embodying the coded signal in a transmittable medium; and
sending means connected to said transmitter for emitting the coded signal medium from the device as an identification of the item to which the device is attached.

4. In a device as set forth in claim 3,
said means supplying power being an electro-magnetic radiation pick-up loop; and
means outside said device radiating energy to said pick-up loop including an induction coil for radiating electro-magnetic energy.

5. In a device as set forth in claim 3,
said means supplying power being a battery.

6. In a device as set forth in claim 3,
the signal emitted being a coded radio signal;
said signal encoder coding a radio signal;
said transmitter being a radio transmitter; and
said sending means being a radio antenna.

7. In a device as set forth in claim 3,
said means for supplying power being activated by energy radiating means outside said device;
batteries in said device;
a signal circuit in said device including said batteries, encoder, and transmitter;
a normally open switch disposed in said signal circuit;
said switch being operably connected to said means supplying power;
said means supplying power when activated being adapted to close said switch to connect battery power in said signal circuit.

8. In a system as set forth in claim 1,
conveyor storage sections in said conveyor system;
said guiding means shunting items on signal to said conveyor storage sections;
said conveyor storage sections accumulating said items;
means controlling release of said items from each said conveyor storage section selectively;
a control panel;
switch means on said panel; and
circuits between said switch means and said means controlling release;
said switch means operating said circuits to actuate said means controlling release of items from said conveyor storage sections to release said items as a group into the conveyor system.

9. In a system as set forth in claim 1,
conveyor shipping sections in said conveyor system;
shunt means in said conveyor system at each conveyor shipping section for directing items in the system to said conveyor shipping sections;
circuits connected to said shunt means;
a control panel;
switches on said panel connected to and controlling said circuits so that items may be guided and propelled in the conveyor system to a certain shipping point via a certain conveyor shipping section selectively.

10. In a system as set forth in claim 1,
a plurality of coded signal emitting devices divided into separate groups with each device of a group having the same signal and each group signal being discernibly different from the other group signals.

11. In a system as set forth in claim 1,
a plurality of coded signal reading means with each being integrated to read a certain coded signal corresponding to the coded signal of a group of signal emitting means so as to be reactive to signals of one group of signal emitting means;
said signal reading means being located in the system at desired points to act upon proximity of an item identified by the signal at the desired point in the system to guide an item at that point;
said coded signal reading means being in multiple if desired to act upon proximity of an item at multiple points in the system to guide the item at multiple points in the system.

12. In a system as set forth in claim 1,
each said signal emitting device having a visual identification mark as to its group;
a rack having bins located at a position in the system where items are put into the system;
each said bin being adapted to hold a plurality of signal devices of each group;
each said bin having a visual identification mark corresponding to the group to be held in the bin;
said rack and bin providing means for holding the signal devices in identified separate groups to facilitate their proper use in the system.

13. In a system as set forth in claim 12,
each bin having intelligence symbol means advising an attendant as to the use of the group of devices held in the bin relative to items to be placed in the system.

14. In a system as set forth in claim 12,
each said bin having warning-precautionary means for alerting an attendant as to the use of the group of signal devices held in the bin relative to items to be placed in the system.

15. In a system as set forth in claim 12,
a control panel;

separate blocks on said panel corresponding to said bins of said racks;

visual identification means on said blocks corresponding to said visual identification means on said bins;

intelligence symbol means on said blocks corresponding to said intelligence symbol means on said bins;

circuits interconnecting said means on said racks and on said blocks; and switches on said panel controlling said circuits to effect condition of said intelligence symbols on said blocks and bins as desired relative to advising the use of the devices in said bins in the system.

16. In a handling system for propelling and guiding articles comprising, propelling means and guiding means; said propelling means including conveyor means for propelling articles between spaced locations, and a plurality of discharge stations located along said conveyor means;

said guiding means including servo-mechanism transfer means at each said conveyor discharge station for switching articles on said conveyor means;

coded signal reading and decoding means located at each said discharge station for controlling said servo-mechanism transfer means on receiving a coded signal;

a plurality of normally inactive coded signal emitting means individually selectively attachable to articles on said conveyor means to identify the article on which attached by the emitted coded signal to each said coded signal reading and decoding means at each said discharge station; said signal emitting means being integrated in a plurality of groups with each said group having a common code signal;

said coded signal emitting means being energizable to actively emit a coded signal; and energizing means located at each said discharge station to power said coded signal emitting means to emit its coded signal;

each article with said attached coded signal emitting means travelling on said conveyor being identified at each said discharge station to said coded signal reading and decoding means when said energizing means activates said coded signal emitting means to emit its coded signal;

said coded signal reading and decoding means upon receiving a signal to which it is coded to react then activating said servo-mechanism means to guide the article at said discharge station on said conveyor means.

References Cited
UNITED STATES PATENTS 3,438,489  4/1969  Cambornac _____ 209—111.5

GERALD M. FORLENZA, Primary Examiner

R. B. JOHNSON, Assistant Examiner

U.S. Cl. X.R.

214—11